(12) United States Patent
Lieberman et al.

(10) Patent No.: US 8,502,803 B2
(45) Date of Patent: Aug. 6, 2013

(54) DRIFT COMPENSATED OPTICAL TOUCH SCREEN

(75) Inventors: Klony Lieberman, Jerusalem (IL); Yaniv Maor, Modiin (IL); Dan Gunders, Tel Aviv (IL)

(73) Assignee: Lumio Inc CA (US)

( * ) Notice: Subject to any disclaimer, the term of this patent is extended or adjusted under 35 U.S.C. 154(b) by 1045 days.

(21) Appl. No.: 12/509,467

(22) Filed: Jul. 26, 2009

(65) Prior Publication Data
US 2010/0253637 A1 Oct. 7, 2010

Related U.S. Application Data

(60) Provisional application No. 61/167,167, filed on Apr. 7, 2009.

(51) Int. Cl.
*G06F 3/042* (2006.01)
*G06F 3/041* (2006.01)
*G06F 3/033* (2006.01)

(52) U.S. Cl.
USPC ........ 345/175; 345/173; 345/179; 178/18.09; 178/19.01

(58) Field of Classification Search
USPC ............... 345/156, 173, 175–179; 178/18.09, 178/18.11, 19.01, 19.05
See application file for complete search history.

(56) References Cited

U.S. PATENT DOCUMENTS

| | | | |
|---|---|---|---|
| 5,257,340 A | 10/1993 | Kaplan | |
| 5,295,047 A | 3/1994 | Windross | |
| 5,905,583 A | 5/1999 | Kawai et al. | |
| 5,910,792 A * | 6/1999 | Hansen et al. | 345/74.1 |
| 6,648,496 B1 | 11/2003 | Elghoroury et al. | |
| 6,783,269 B2 | 8/2004 | Pashley et al. | |
| 6,828,959 B2 * | 12/2004 | Takekawa et al. | 345/173 |
| 6,972,401 B2 | 12/2005 | Akitt et al. | |
| 7,021,809 B2 | 4/2006 | Iwasa et al. | |
| 7,099,553 B1 | 8/2006 | Graham et al. | |
| 7,163,326 B2 | 1/2007 | Cassarly et al. | |
| 7,535,610 B2 * | 5/2009 | Kitaoka et al. | 359/196.1 |
| 2005/0128190 A1 | 6/2005 | Ryynanen | |
| 2005/0248540 A1 | 11/2005 | Newton | |
| 2009/0135162 A1 * | 5/2009 | Van De Wijdeven et al. | 345/175 |
| 2009/0141002 A1 * | 6/2009 | Sohn et al. | 345/175 |

FOREIGN PATENT DOCUMENTS

WO WO 2009/029764 A1 3/2009

* cited by examiner

*Primary Examiner* — Lun-Yi Lao
*Assistant Examiner* — Jarurat Suteerawongsa

(57) ABSTRACT

An optical touch screen including a display surface, an optical illumination assembly arranged along at least part of a periphery of the display surface, at least one light detector arranged to detect light distribution produced by the optical illumination assembly and changes in the light distribution produced by the presence of an object in predetermined propinquity to the display surface, detection circuitry receiving at least one output from the at least one light detector and providing an output indication of a two-dimensional location of the object relative to the display surface, calibration functionality responsive to changes in light distribution other than changes produced by the presence of an object in predetermined propinquity to a region of the display surface for calibrating the detection circuitry, at least one auxiliary illumination source, and at least one partially transmissive, partially reflective optical element disposed along a light path to the at least one light detector, providing a light transmissive optical path for light to the at least one light detector and a light reflective optical path for light from the at least one auxiliary illumination source.

3 Claims, 17 Drawing Sheets

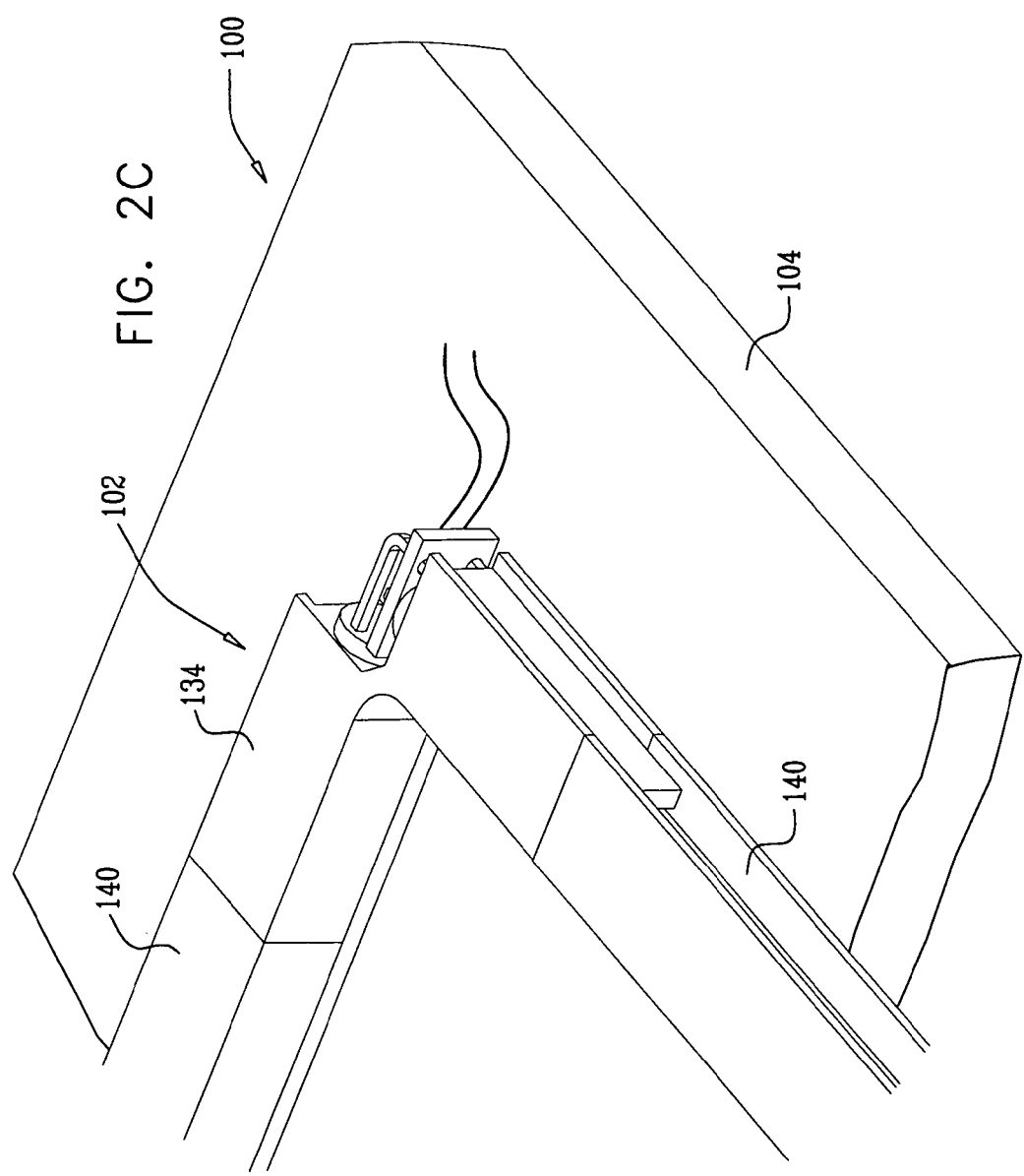

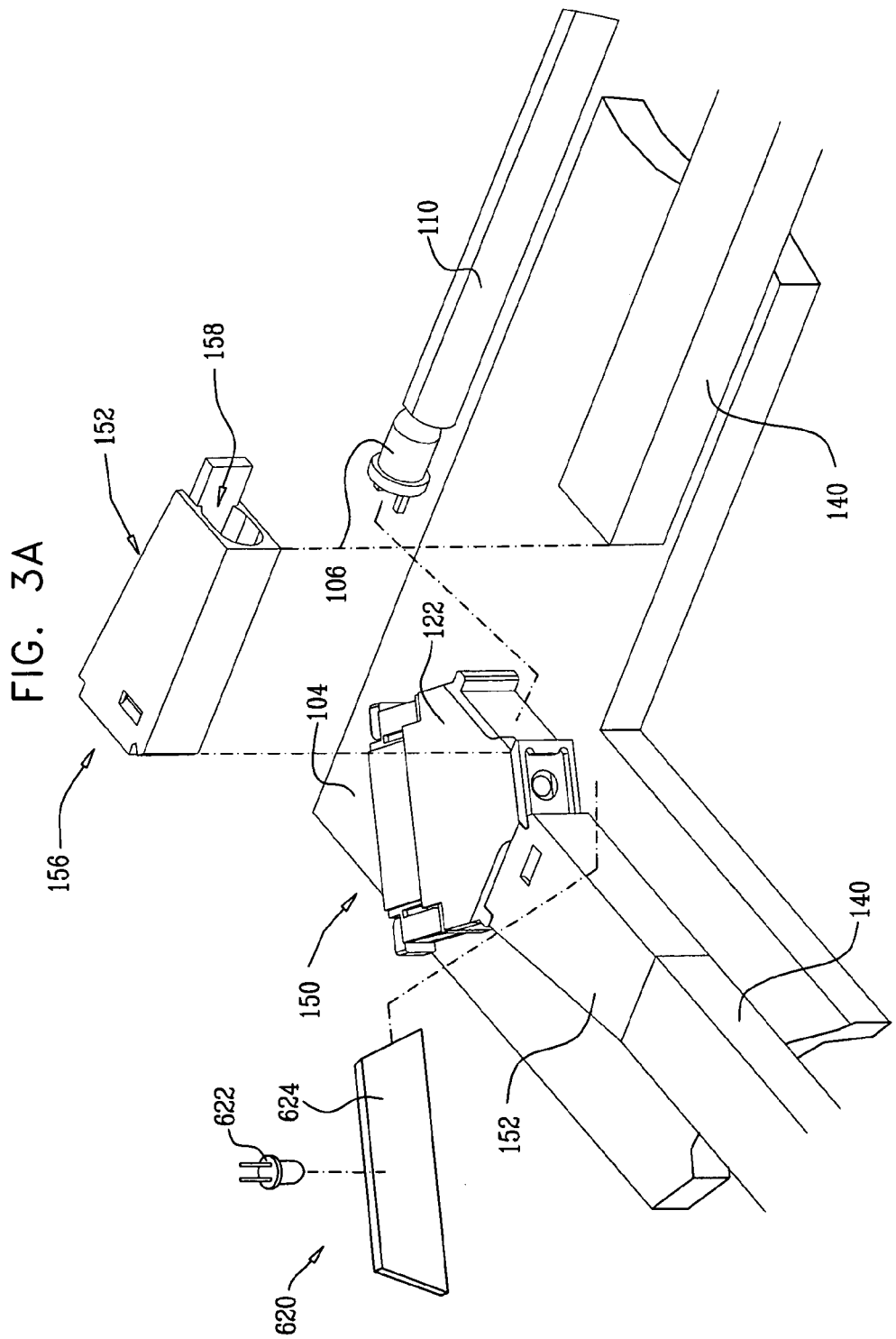

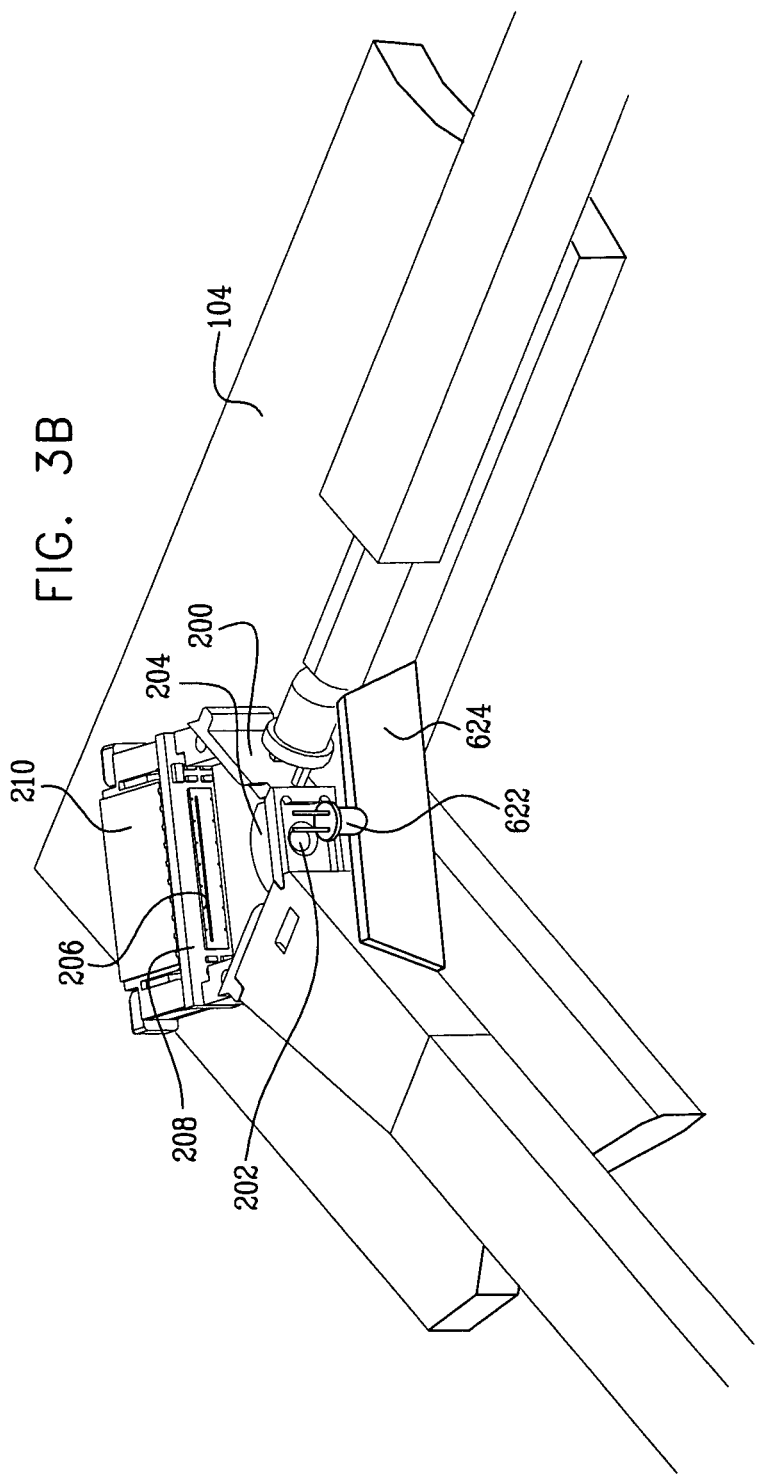

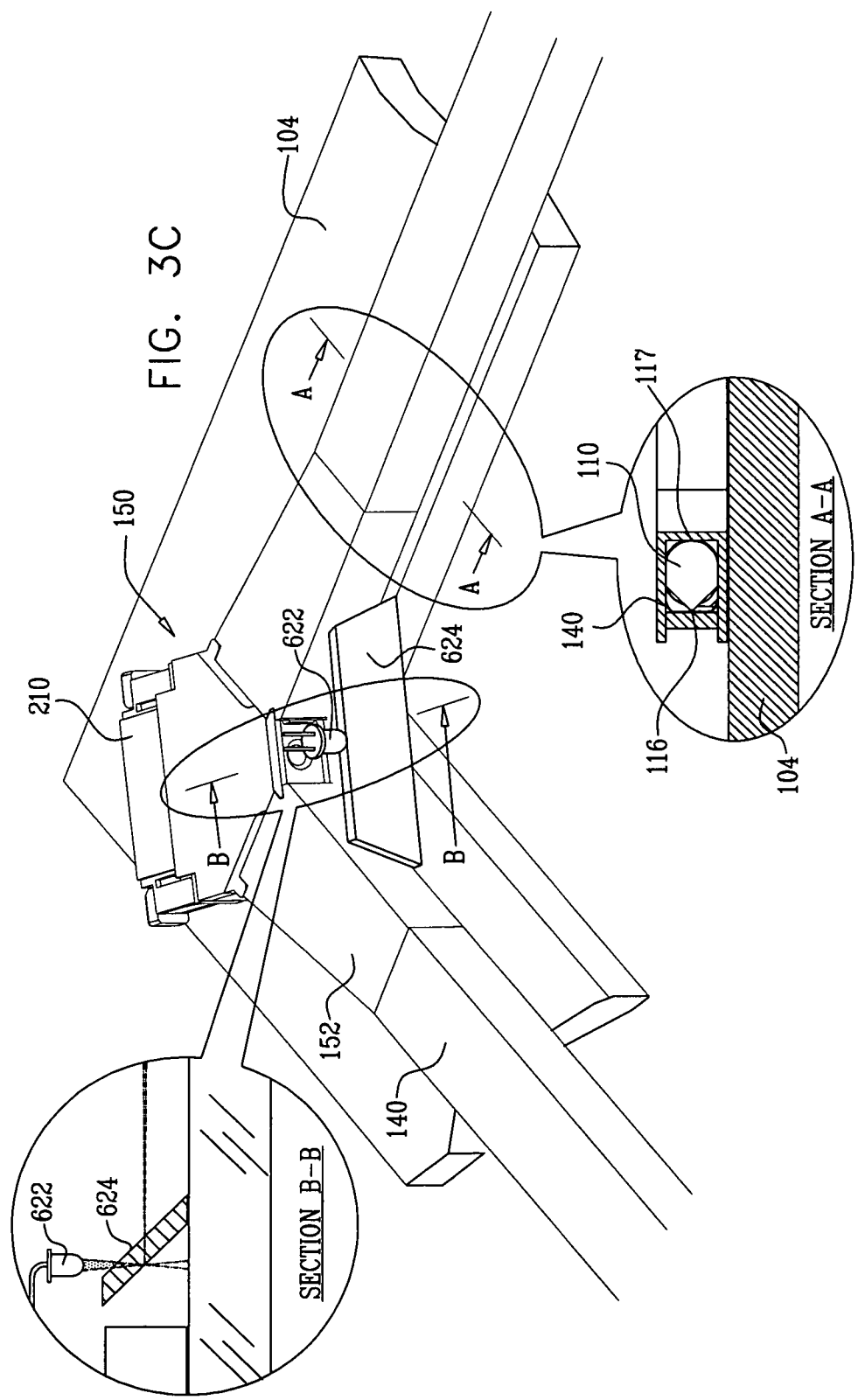

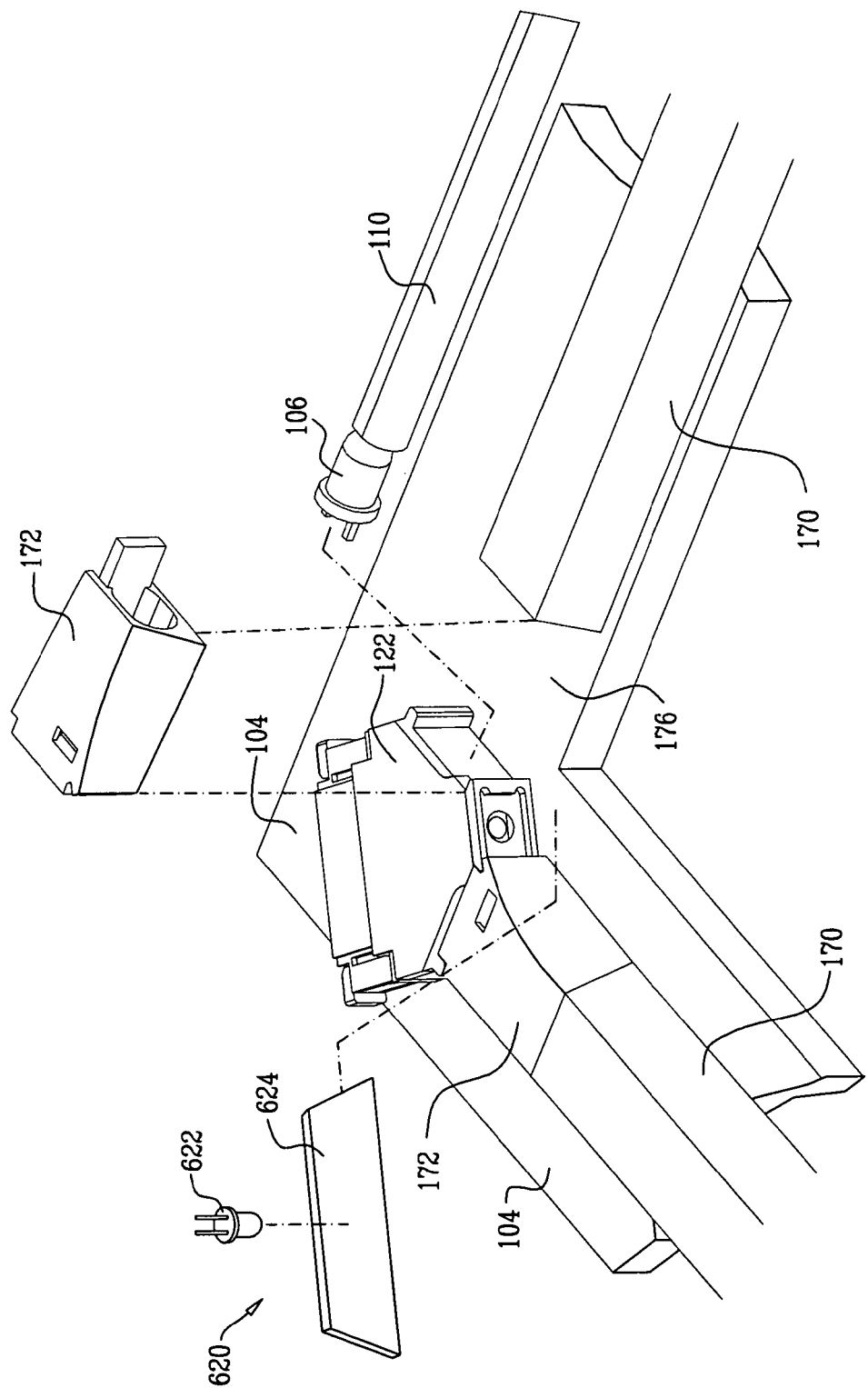

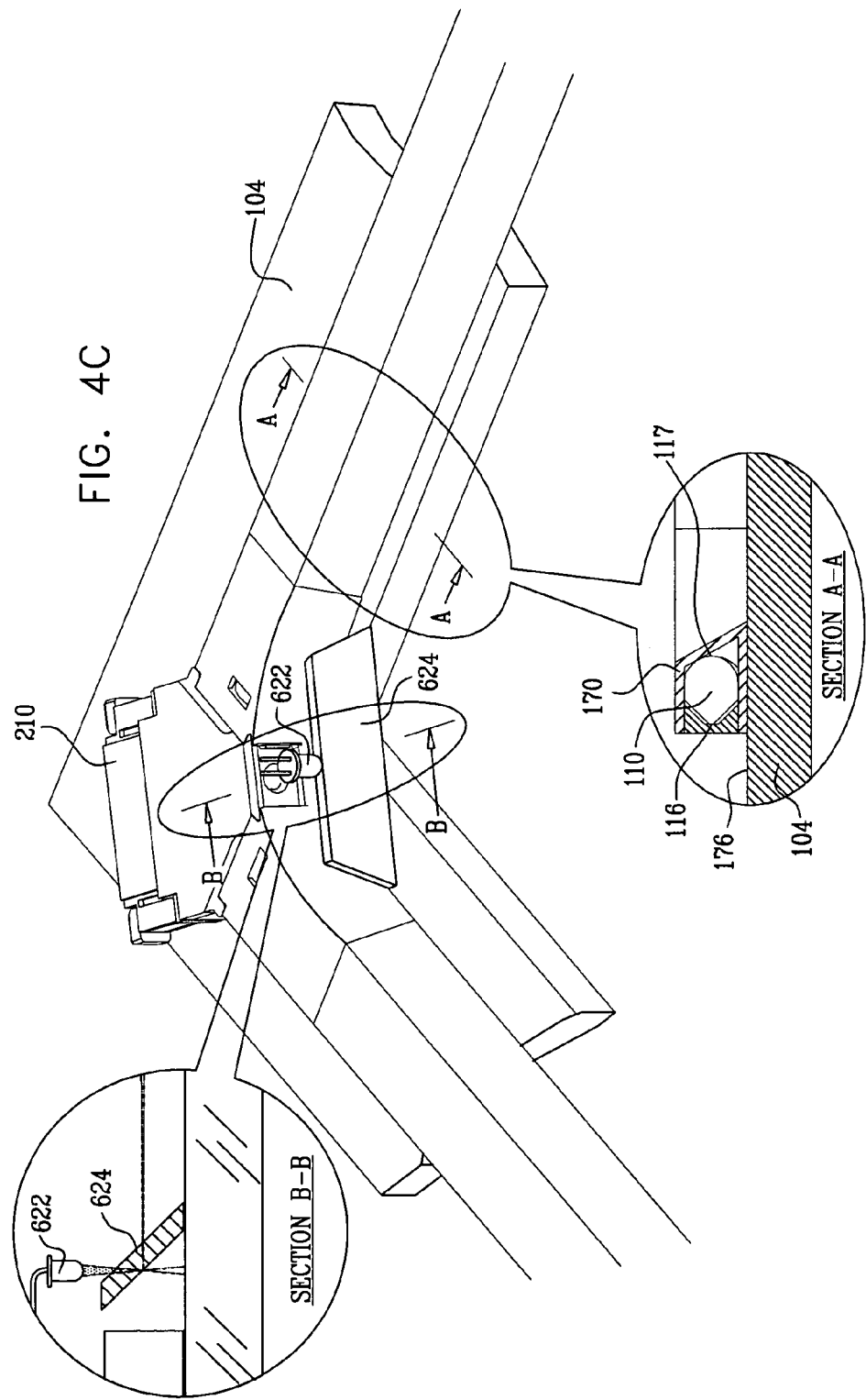

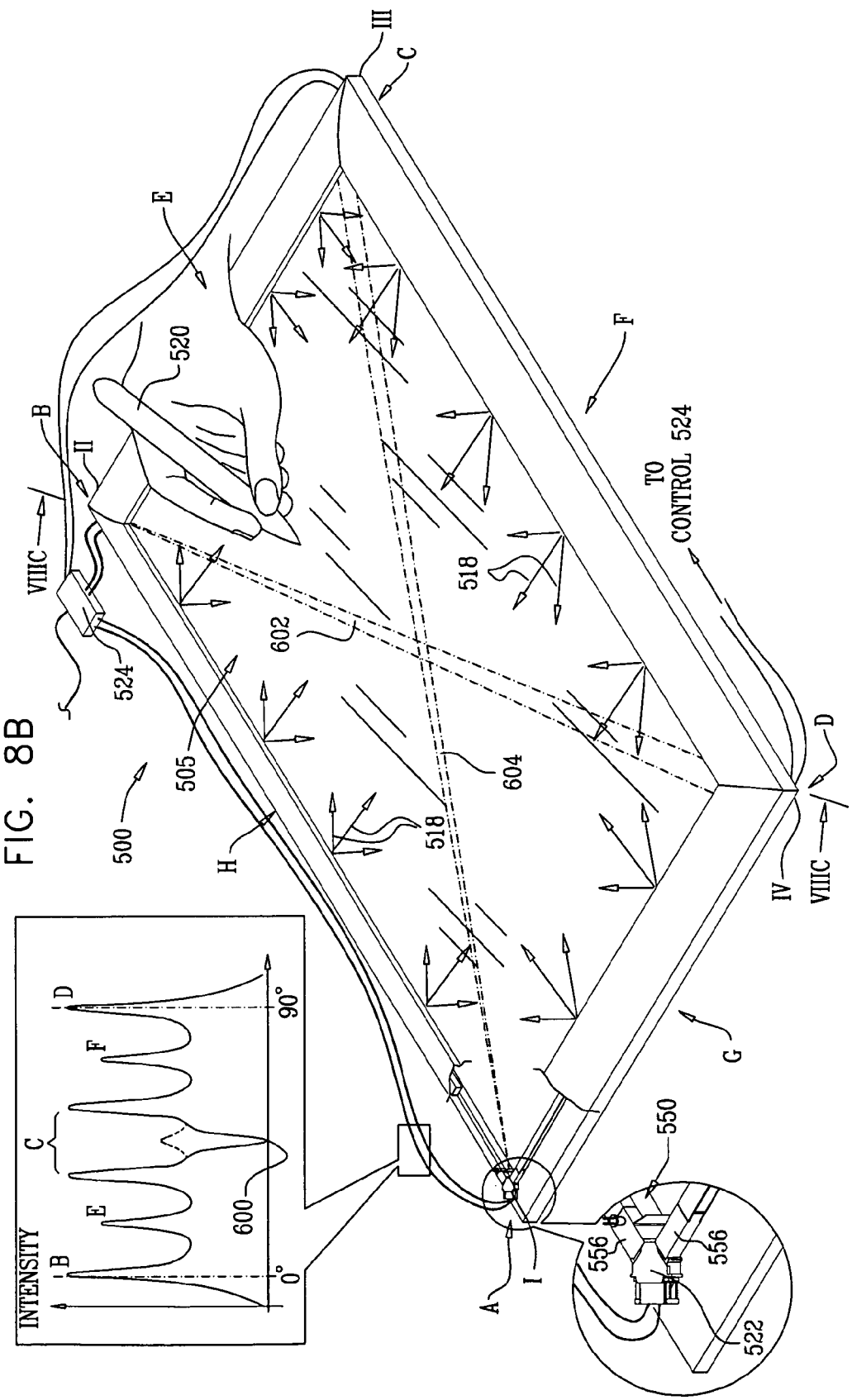

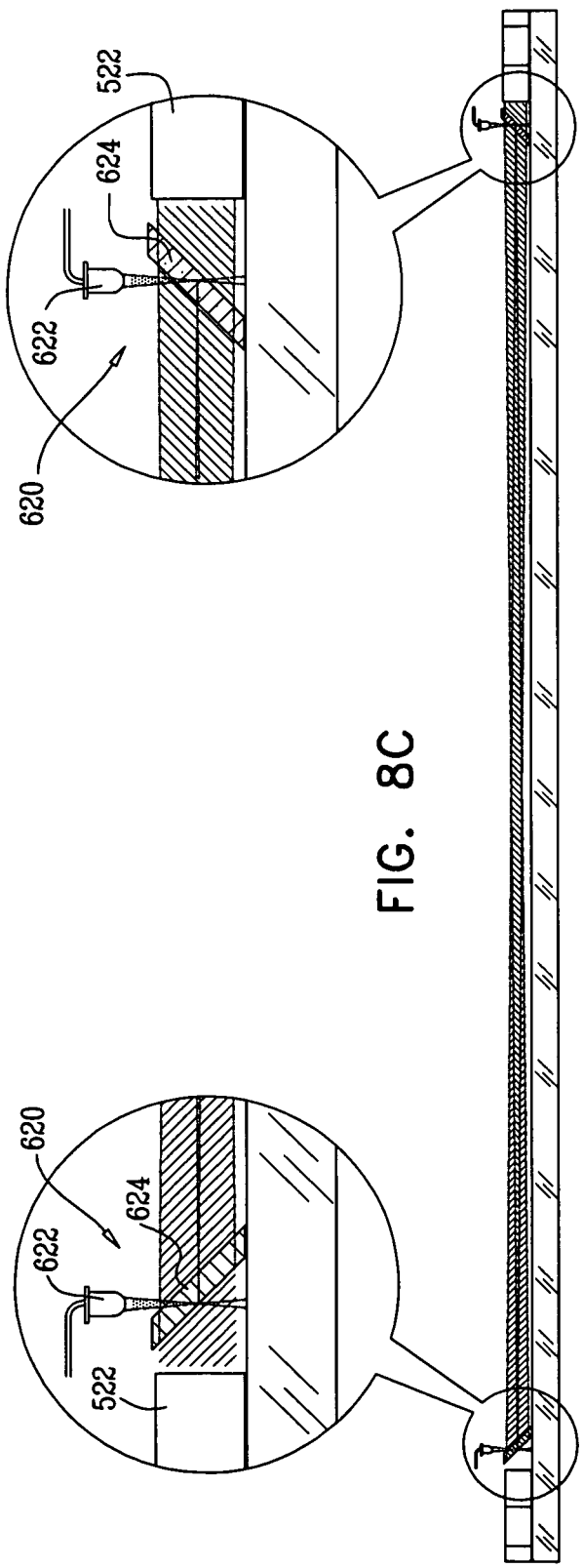

DRIFT COMPENSATED OPTICAL TOUCH SCREEN

REFERENCE TO RELATED APPLICATIONS

Reference is hereby made to U.S. Provisional Patent Application 61/167,167 167,162 filed Apr. 7, 2009 and entitled Illumination for Optical Touch Panel, the disclosure of which is hereby incorporated by reference and priority of which is hereby claimed pursuant to 37 CFR 1.78(a)(4) and (5)(i).

FIELD OF THE INVENTION

The present invention relates to optical touch panels and illumination therefore.

BACKGROUND OF THE INVENTION

The following U.S. and PCT Patent Publications are believed to represent the current state of the art: U.S. Pat. Nos. 7,099,553; 6,972,401; 5,257,340; 6,783,269; 5,905,583; 5,295,047; 7,163,326; 6,648,496 and 7,021,809; U.S. Patent Application Publication Nos. 2005/0248540 and 2005/0128190; and PCT Application No. WO 2009/029764 A1

SUMMARY OF THE INVENTION

The present invention seeks to provide optical illumination for use with optical touch panels and optical touch panels utilizing these assemblies.

There is thus provided in accordance with a preferred embodiment of the present invention an optical touch screen including a generally planar display surface, an optical illumination assembly arranged generally along at least part of a periphery of the generally planar display surface, at least one light detector arranged to detect light distribution produced by the optical illumination assembly and changes in the light distribution produced by the presence of an object in predetermined propinquity to a region of the generally planar display surface, detection circuitry receiving at least one output from the at least one light detector and providing an output indication of a two-dimensional location of the object relative to the generally planar display surface, at least one auxiliary illumination source, and at least one partially transmissive, partially reflective optical element disposed along a light path to the at least one light detector, providing a light transmissive optical path for light to the at least one light detector and providing a light reflective optical path for light from the at least one auxiliary illumination source.

Preferably, the light transmissive optical path and the light reflective optical path are at least partially coextensive. Additionally or alternatively, the light transmissive optical path and the light reflective optical path at least partially extend parallel to the generally planar display surface.

In accordance with a preferred embodiment of the present invention the at least one light detector includes first and second light detectors which each lie in a field of view of the other, and the at least one auxiliary illumination source includes first and second auxiliary illumination sources, and the at least one partially transmissive, partially reflective optical element includes first and second partially transmissive, partially reflective optical elements, disposed along respective light paths to respective ones of the first and second light detectors.

Preferably, light from respective ones of the first and second auxiliary illumination sources is directed by respective ones of the first and second partially transmissive, partially reflective optical elements towards respective ones of the second and first light detectors.

In accordance with a further preferred embodiment of the present invention the optical illumination assembly and the at least one light detector are arranged such that light from the optical illumination assembly is not directed towards the at least one light detector from at least one direction within a field of view of the at least one light detector.

Preferably, the at least one auxiliary light source and the at least one partially transmissive, partially reflective optical element are operative to provide light from the at least one auxiliary light source towards the at least one light detector from at least one direction.

There is also provided in accordance with another preferred embodiment of the present invention an optical touch screen including a generally planar display surface, an optical illumination assembly arranged generally along at least part of a periphery of the generally planar display surface, at least one light detector arranged to detect light distribution produced by the optical illumination assembly and changes in the light distribution produced by the presence of an object in predetermined propinquity to a region of the generally planar display surface, detection circuitry receiving at least one output from the at least one light detector and providing an output indication of a two-dimensional location of the object relative to the generally planar display surface, and calibration functionality responsive to changes in the light distribution other than changes produced by the presence of an object in predetermined propinquity to a region of the generally planar display surface for calibrating the detection circuitry.

In accordance with a preferred embodiment of the present invention the calibration functionality is responsive to temperature induced changes in the light distribution. Preferably, the temperature induced changes result at least in part from temperature induced changes in a focal length of at least one optical element in the at least one light detector.

In accordance with a further preferred embodiment of the present invention the calibration functionality calibrates an output of the detection circuitry which represents the two-dimensional location of the object relative to the generally planar display surface.

In accordance with yet a further preferred embodiment of the present invention the changes in light distribution other than changes produced by the presence of an object in predetermined propinquity to a region of the generally planar display surface comprise shifts in apparent positions of peaks of light sources in the optical illumination assembly.

BRIEF DESCRIPTION OF THE DRAWINGS

The present invention will be understood and appreciated more fully from the following detailed description, taken in conjunction with the drawings in which:

FIGS. 2A, 2B and 2C are simplified respective exploded view, disassembled view and assembled view illustrations of illumination, mechanical coupling and optical coupling apparatus, useful in the touch panel of FIGS. 1A & 1B;

FIGS. 3A, 3B and 3C are simplified respective exploded view, partially assembled view and assembled view illustrations of a portion of the touch panel of FIGS. 1A & 1B, constructed and operative in accordance with an embodiment of the invention;

FIGS. 4A, 4B and 4C are simplified respective exploded view, partially assembled view and assembled view illustrations of a portion of the touch panel of FIGS. 1A & 1B, constructed and operative in accordance with another embodiment of the invention;

FIGS. 8A & 8B are simplified respective exploded and assembled view illustrations of a touch panel constructed and operative in accordance with another preferred embodiment of the present invention including a graph indicating both a change in the angular response of sensors in the touch panel responsive to temperature changes and an angular region of the touch panel for which the sensors would be non-responsive but for the provision of an auxiliary illumination subsystem; and FIG. 8C is a simplified sectional illustration of the auxiliary illumination subsystem employed in the touch panel of FIGS. 8A & 8B.

DETAILED DESCRIPTION OF PREFERRED EMBODIMENTS

Figure 1A:
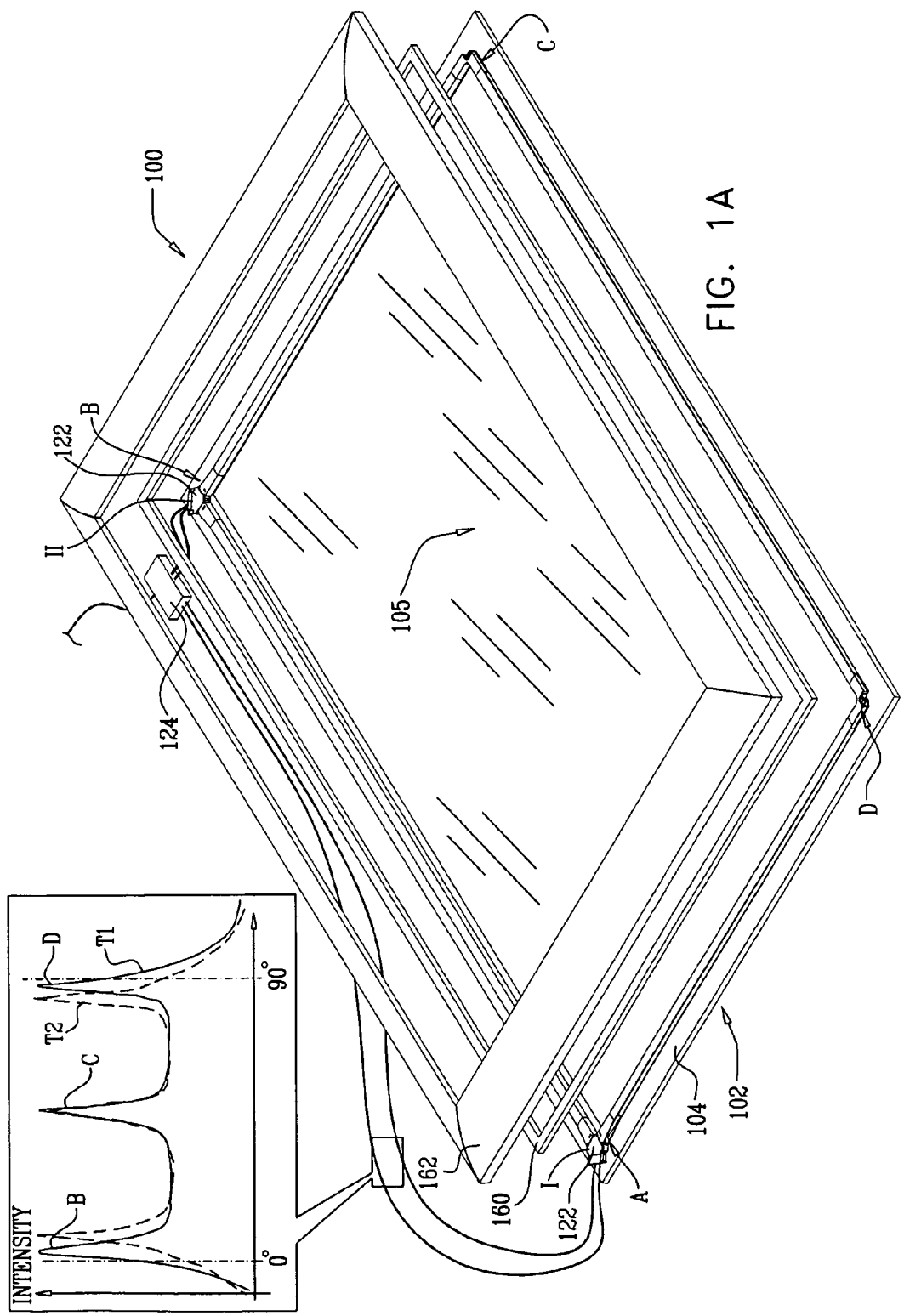
FIGS. 1A & 1B are simplified respective exploded and assembled view illustrations of a touch panel constructed and operative in accordance with a preferred embodiment of the present invention, including a graph indicating a change in the angular response of sensors in the touch panel responsive to temperature changes.

Reference is now made to FIGS. 1A-3C which illustrate an optical touch panel 100 constructed and operative in accordance with a preferred embodiment of the present invention. As seen in FIGS. 1A and 1B, the touch panel 100 comprises an optical illumination assembly 102 which is preferably arranged along and above all or part of the periphery of a support 104, typically a glass plate as shown in FIG. 1A. Alternatively, the glass plate may be obviated and the support 104 may be a frame, as shown in FIGS. 2A-2C.

Preferably, the optical illumination assembly 102 extends along most of the periphery of support 104 and typically along three of four edges of a generally planar detection region 105.

Figure 2A:
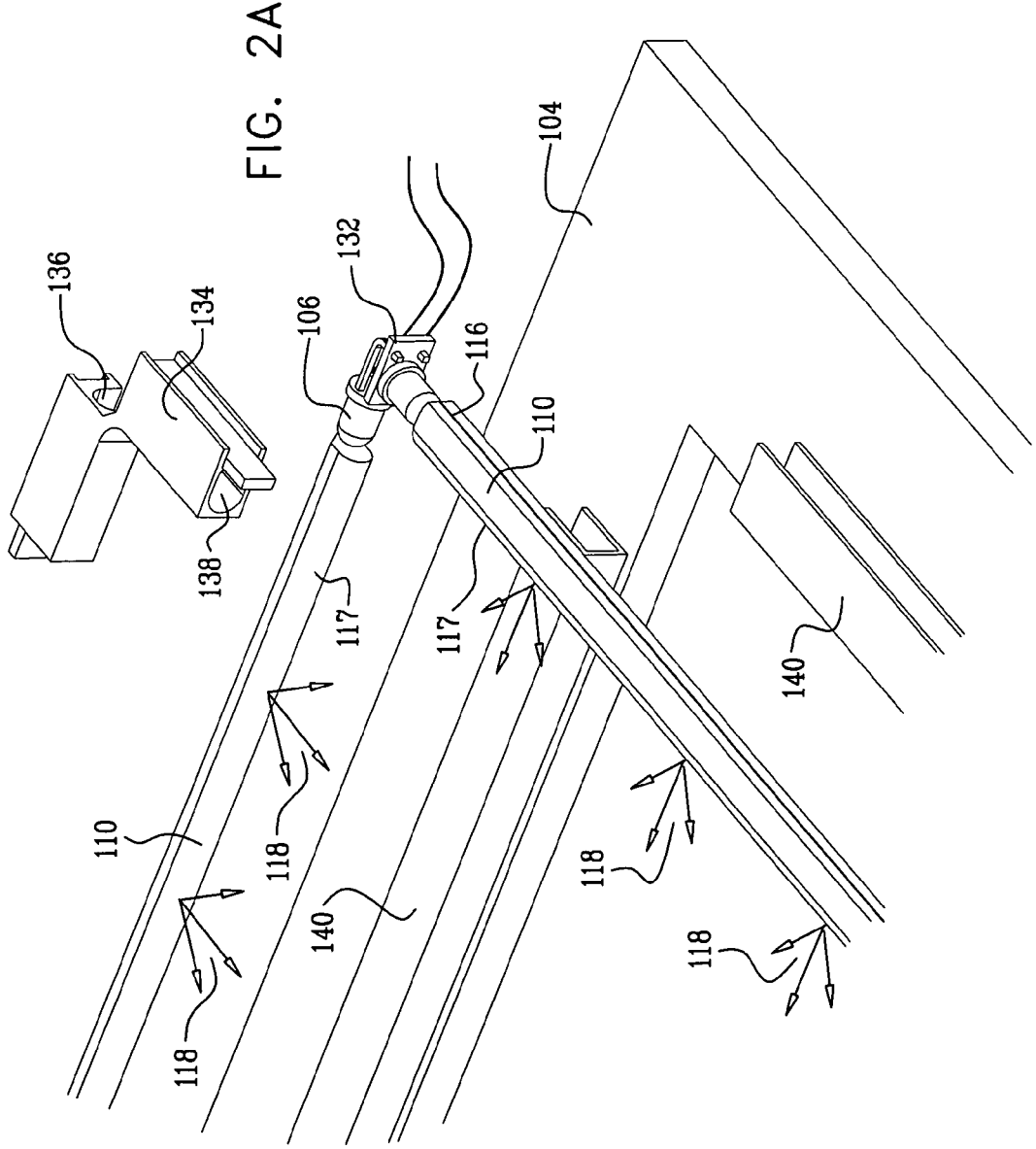
Figure 2B:
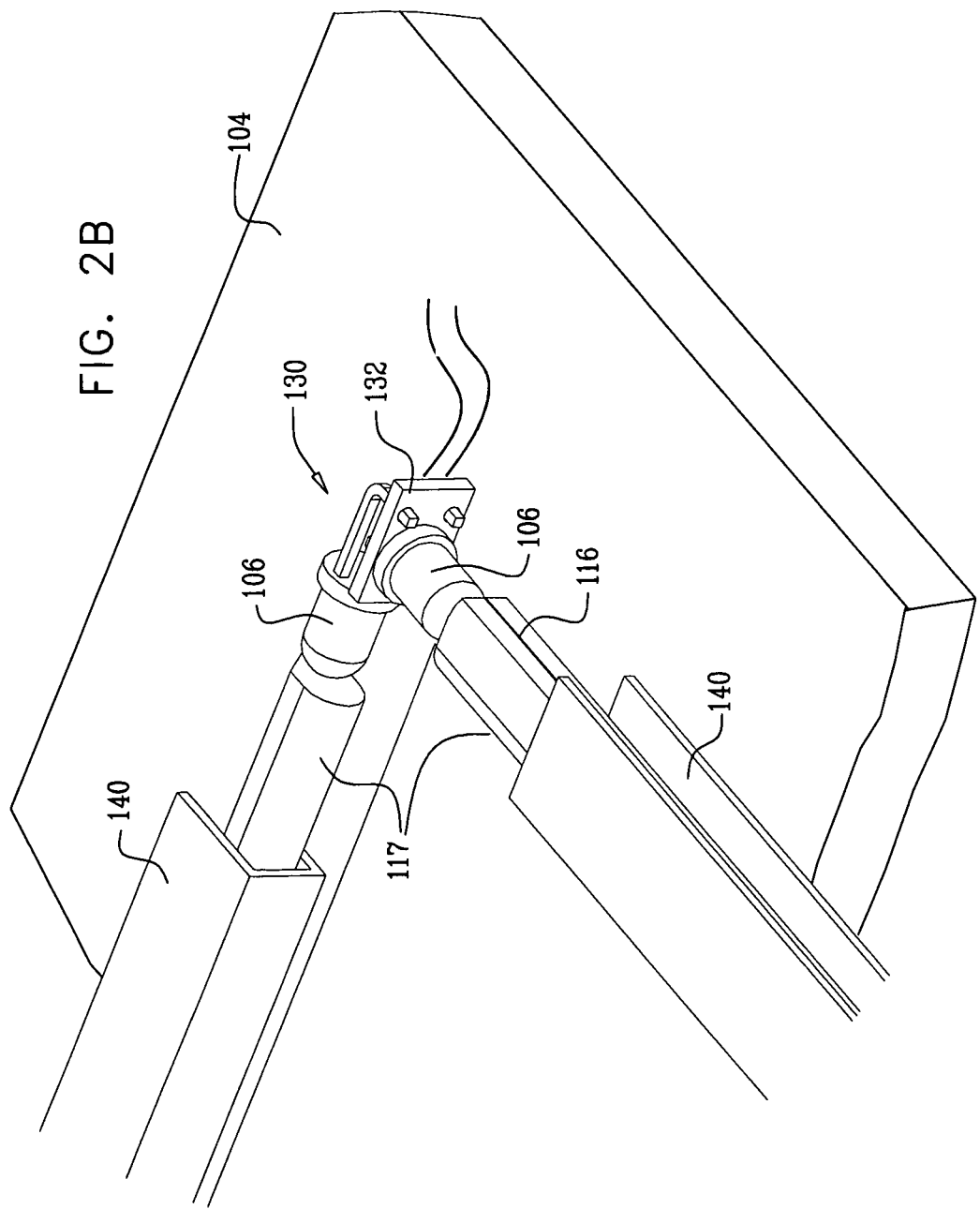

In accordance with a preferred embodiment of the present invention, the optical illumination assembly 102 receives illumination from light sources 106, such as an LED or a diode laser, preferably an infrared laser or infrared LED. As seen in FIGS. 2A and 2B, light sources 106 are preferably located at one or more corners of the periphery of the generally planar detection region 105. The one or more light sources at each respective corner are designated by letters A, B, C and D.

In accordance with a preferred embodiment of the present invention, the optical illumination assembly 102 comprises at least one light guide 110, such as a plastic rod, which preferably has at least one light scatterer 116 at least one location therealong, preferably opposite at least one light transmissive region 117 of the light guide 110, at which region 117 the light guide 110 has optical power A surface of light guide 110 at transmissive region 117 preferably has a focus located in proximity to light scatterer 116.

In the illustrated embodiment, light scatterer 116 is preferably defined by a narrow strip of white paint extending along the plastic rod along at least a substantial portion of the entire length of the optical illumination assembly 102. In an alternative preferred embodiment, not shown, light guide 110 and light scatterer 116 are integrally formed as a single element, for example by co-extruding a transparent plastic material along with a pigment embedded plastic material to form a thin light scattering region 116 at an appropriate location along light guide 110.

In accordance with a preferred embodiment of the present invention, the at least one light scatterer 116 is operative to scatter light which is received from the light source 106 and passes along the at least one light guide 110. The optical power of the light guide 110 at the at least one light transmissive region 117 collimates and directs the scattered light in a direction generally away from the scatterer 116, as indicated generally by reference numeral 118. It is appreciated that generally every location in generally planar detection region 105 receives light generally from every location along the at least one light transmissive region 117.

In accordance with a preferred embodiment of the present invention, the at least one light guide 110 extends generally continuously along a periphery of a light curtain area defined by the detection region 105 and the at least one light scatterer 116 extends generally continuously along the periphery, directing light generally in a plane, filling the interior of the periphery and thereby defining a light curtain therewithin. In an alternative embodiment, the at least one light guide 110 extends along a periphery of a light curtain area defined by the detection region 105 and the at least one light scatterer 116 includes a plurality of separate light scatterers distributed along the periphery, whereby the plurality of light scatterers direct light generally in a plane, filling the interior of the periphery and thereby together defining a light curtain therewithin.

Impingement of an object, such as a finger or stylus 120, upon support 104 preferably is sensed by one or more light sensor assemblies 122, preferably disposed at corners of detection region 105. The light sensor assemblies 122 at the respective corners are respectively designated by roman numerals I & II. The sensor assemblies 122 detect changes in the light received from the optical illumination assembly 102 produced by the presence of stylus 120 in the detection region 105. Preferably, sensor assemblies 122 are located in the same plane as the optical illumination assembly 102. Preferably, two sensor assemblies 122 are sufficient to detect stylus 120 anywhere in the detection region 105, each sensor assembly 122 being located at an adjacent corner of the detection region 105 and having at least 90 degree coverage.

Preferably, sensor assemblies 122 each employ linear CMOS sensors, such as an ELIS-1024 linear image sensor commercially available from Panavision SVI, LLC of One Technology Place, Homer, N.Y., which are suitable for use in triangulation. The outputs of sensor assemblies 122 are supplied to detection circuitry 124, such as that described in assignee's U.S. Published Patent Application 2006/0187198 and U.S. Provisional Applications 60/819,891; 60/832,508 and 60/889,746, the disclosures of which are hereby incorporated by reference, which provides an output indication of the two dimensional location of the stylus 120 impingement in the detection region 105.

In the illustrated embodiment, there are provided at least two mechanical coupling and optical coupling assemblies 130 (FIG. 2B), each of which includes a pair of light sources 106, preferably mounted onto a PCB 132, and a corner element 134 (FIGS. 2A and 2C), which includes sockets 136, for receiving and retaining light sources 106, and sockets 138, for receiving and retaining ends of light guides 110. Corner elements 134 are preferably located at two adjacent corners of support 104 and are adhered thereto preferably by adhesive. Corner elements 134 are arranged to butt against a pair of mutually perpendicularly extending light guide covers 140.

There are also preferably provided at least two sensor, illumination, mechanical coupling and optical coupling assemblies 150, each of which includes a sensor assembly 122 and a pair of mechanical and optical coupling elements 152 which are connected to sensor assembly 122. Each of mechanical and optical coupling elements 152 preferably includes a socket 156, for receiving and retaining light sources 106, and a socket 158, for receiving and retaining an end of a light guide 110. Each of mechanical and optical coupling elements 152 is arranged to butt against light guide cover 140. Alternatively, one or both light sources 106 may be obviated in assemblies 150.

Preferably there is provided a water-proof and dust proof seal between support 104, light guide covers 140 and assemblies 130 and 150, thereby to protect the touch panel assembly. The interiors of light guide covers 140 and assemblies 130 and 150 are preferably sealed from the outside. Preferably a circumferential gasket 160 is employed to sealingly surround these elements at the periphery of support 104 and to seal them to a circumferential cover element 162.

Figure 4B:
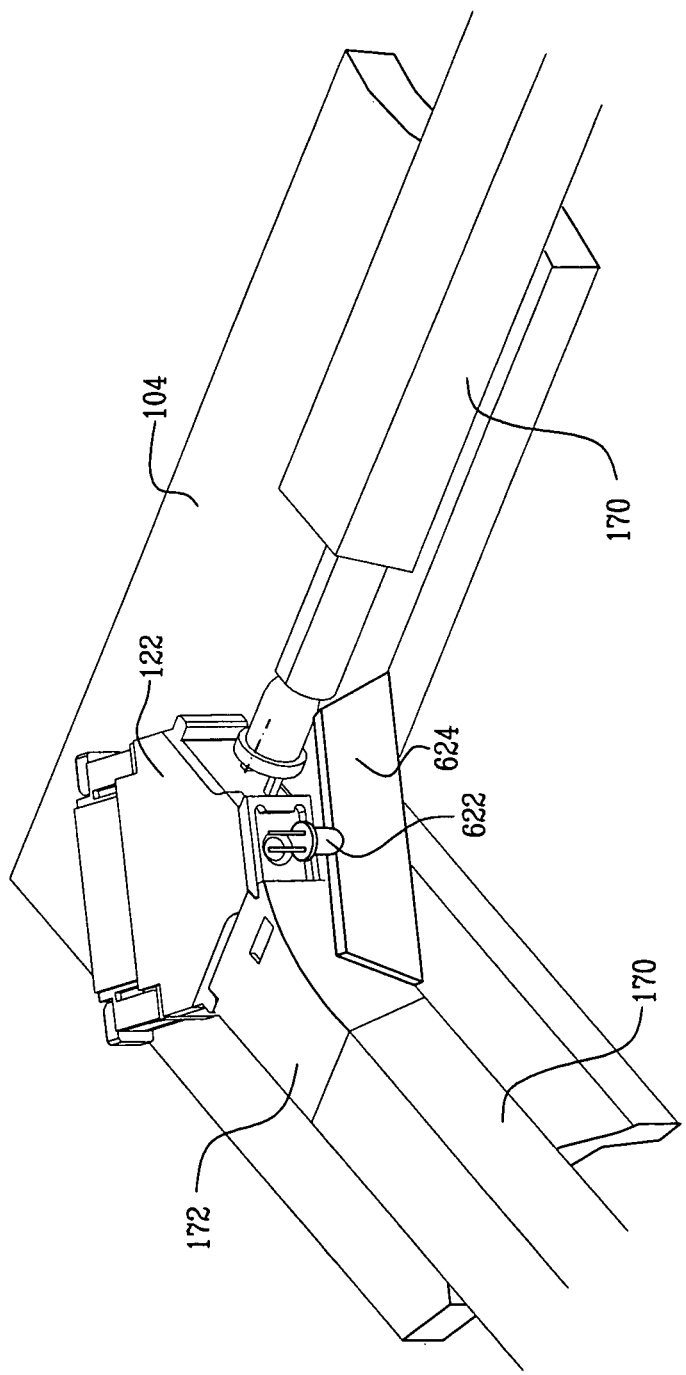

Reference is now made to FIGS. 4A-4C. Whereas in the embodiment of FIGS. 3A-3C, the light guide covers 140 preferably have a generally rectangular cross section, FIGS. 4A-4C show a structure similar to that of FIGS. 3A-3C wherein light guide covers 170 and mechanical and optical coupling elements 172 have a non-rectangular cross section, which defines an obtuse angle with a top surface 176 of support 104. This arrangement tends to avoid collection of dust and dirt between surface 176 and light guide covers 170.

Figure 5A:
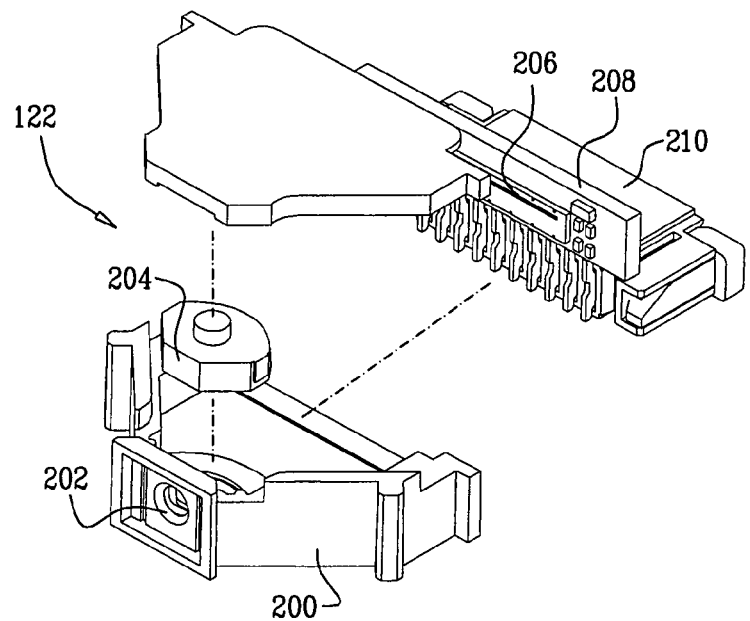
FIGS. 5A, 5B and 5C are simplified respective exploded view, partially assembled view and assembled view illustrations of a sensor assembly forming part of the apparatus of FIGS. 1A-2C, constructed and operative in accordance with a first embodiment of the invention.
Figure 5B:
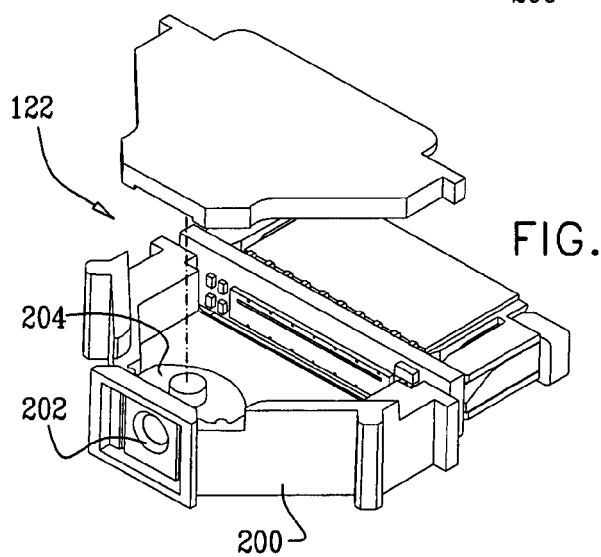
Figure 5C:
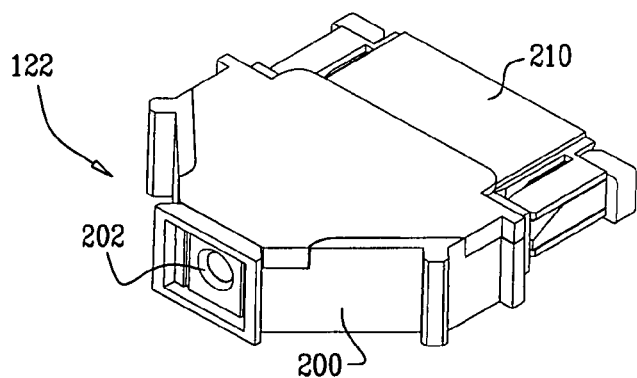

Reference is now made additionally to FIGS. 5A-5C, which are simplified respective exploded view, partially assembled view and assembled view illustrations of sensor assembly 122 forming part of the apparatus of FIGS. 1A-2C, constructed and operative in accordance with a first embodiment of the invention.

As seen in FIGS. 5A-5C, sensor assembly 122 comprises a housing 200, preferably injection molded of plastic and defining a lens mount window 202 in which is fixed a lens 204, which may be injection molded therewith. Disposed in predetermined alignment with lens 204 is a solid state detector 206, such as a linear CMOS sensor, preferably an ELIS-1024 linear image sensor commercially available from Panavision SVI, LLC of One Technology Place, Homer, N.Y., fixed onto a printed circuit board 208, which in turn is seated in housing 200. An electrical connector 210, also fixed in housing 200, provides electrical connections with detector 206.

Figure 6A:
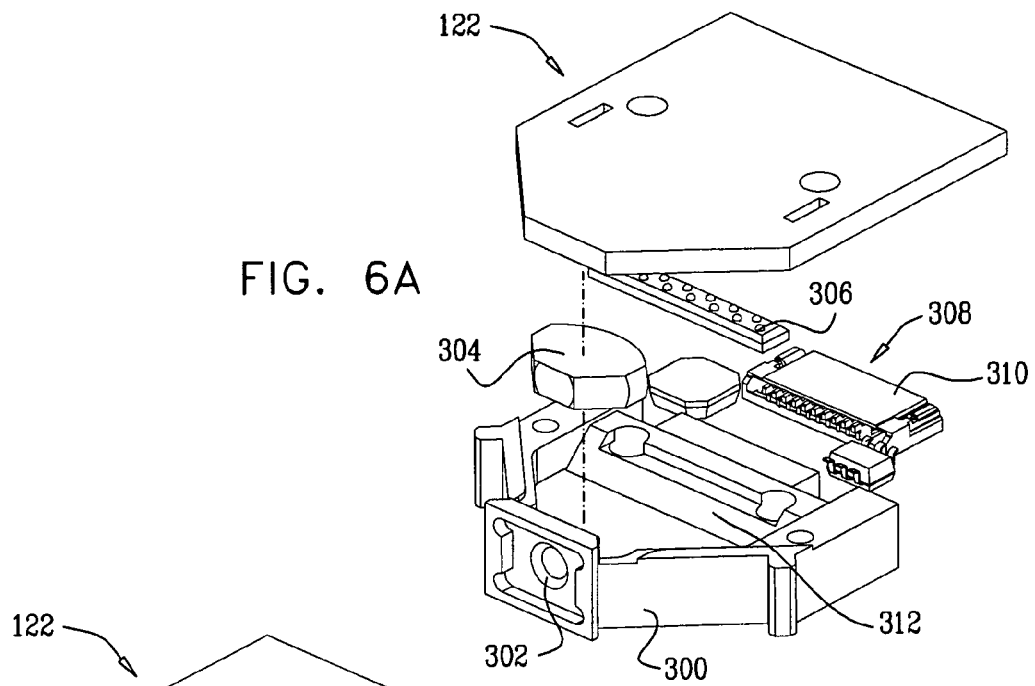
FIGS. 6A, 6B and 6C are simplified respective exploded view, partially assembled view and assembled view illustrations of a sensor assembly forming part of the apparatus of FIGS. 1A-2C, constructed and operative in accordance with a second embodiment of the invention.
Figure 6B:
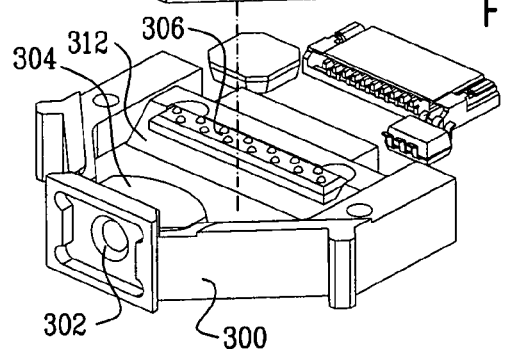
Figure 6C:
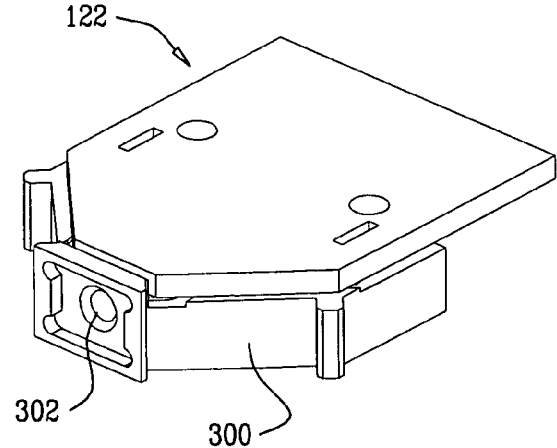

Reference is now made additionally to FIGS. 6A-6C, which are simplified respective exploded view, partially assembled view and assembled view illustrations of sensor assembly 122 forming part of the apparatus of FIGS. 1A-2C, constructed and operative in accordance with a second embodiment of the invention.

As seen in FIGS. 6A-6C, sensor assembly 122 comprises a housing 300, preferably injection molded of plastic and defining a lens mount window 302 in which is fixed a lens 304, which may be injection molded therewith. Disposed in predetermined alignment with lens 304 is a solid state detector 306, such as a linear CMOS sensor, preferably an ELIS-1024-CSP chip scale packaged linear image sensor commercially available from Panavision SVI, LLC of One Technology Place, Homer, N.Y., connected to a printed circuit board 308 having mounted thereon an electrical connector 310. Detector 306 views the detection plane via a mirror 312, fixed ha housing 300. Detector 306 is fixed to mirror 312.

Figure 7A:
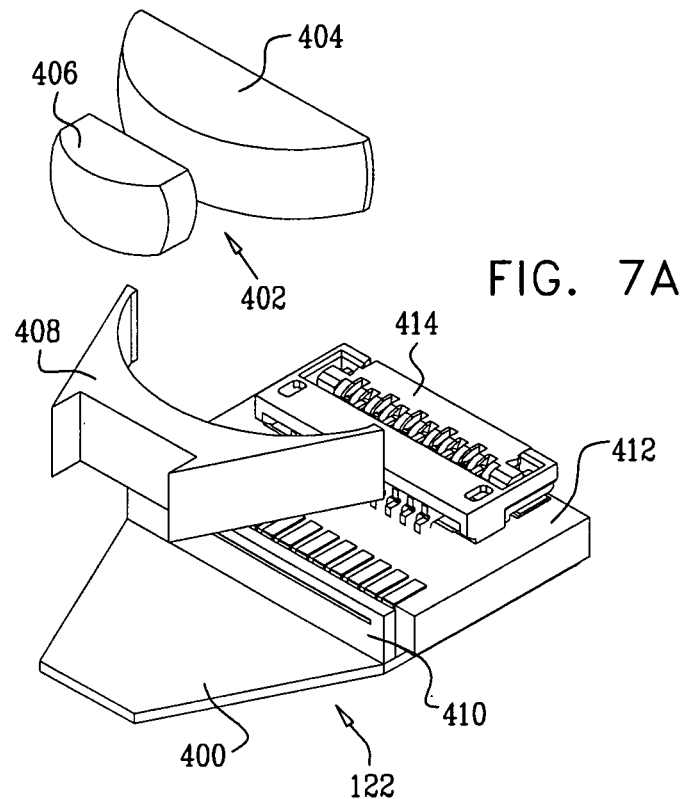
FIGS. 7A & 7B are simplified respective exploded view and assembled view illustrations of a sensor assembly forming part of the apparatus of FIGS. 1A-2C, constructed and operative in accordance with a third embodiment of the invention.
Figure 7B:
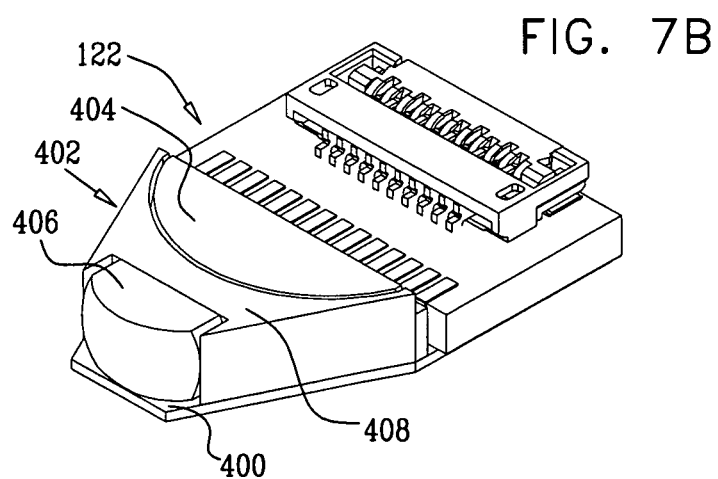

Reference is now made additionally to FIGS. 7A and 7B, which are simplified respective exploded view and assembled view illustrations of sensor assembly 122 forming part of the apparatus of FIGS. 1A-2C, constructed and operative in accordance with a third embodiment of the invention, characterized by small size.

As seen in FIGS. 7A and 7B, sensor assembly 122 comprises a support plate 400, preferably formed of metal and defining a reference surface for a lens assembly 402, including first and second lenses 404 and 406 joined by a polymer mounting structure 408. Disposed in predetermined alignment with lens assembly 402 and fixed to support plate 400 is a solid state detector 410, such as a linear CMOS sensor, preferably an ELIS-1024-CSP chip scale packaged linear image sensor commercially available from Panavision SVI, LLC of One Technology Place, Homer, N.Y., having connected thereto an edge connection printed circuit board 412 having mounted thereon an electrical connector 414.

Returning to FIGS. 1A and 1B, it is seen that both include a graph indicating a change in the angular response of one of the sensor assemblies 122 of the touch panel 100, responsive to temperature changes. The changes in the angular response may arise from physical distortions in the lenses forming part of the sensor assembly 122, such as lens 204 in the embodiment of FIGS. 5A-5C, lens 304 in the embodiment of FIGS. 6A-6C and lenses 404 and 406 in the embodiment of FIGS. 7A and 7B.

Figure 1B:
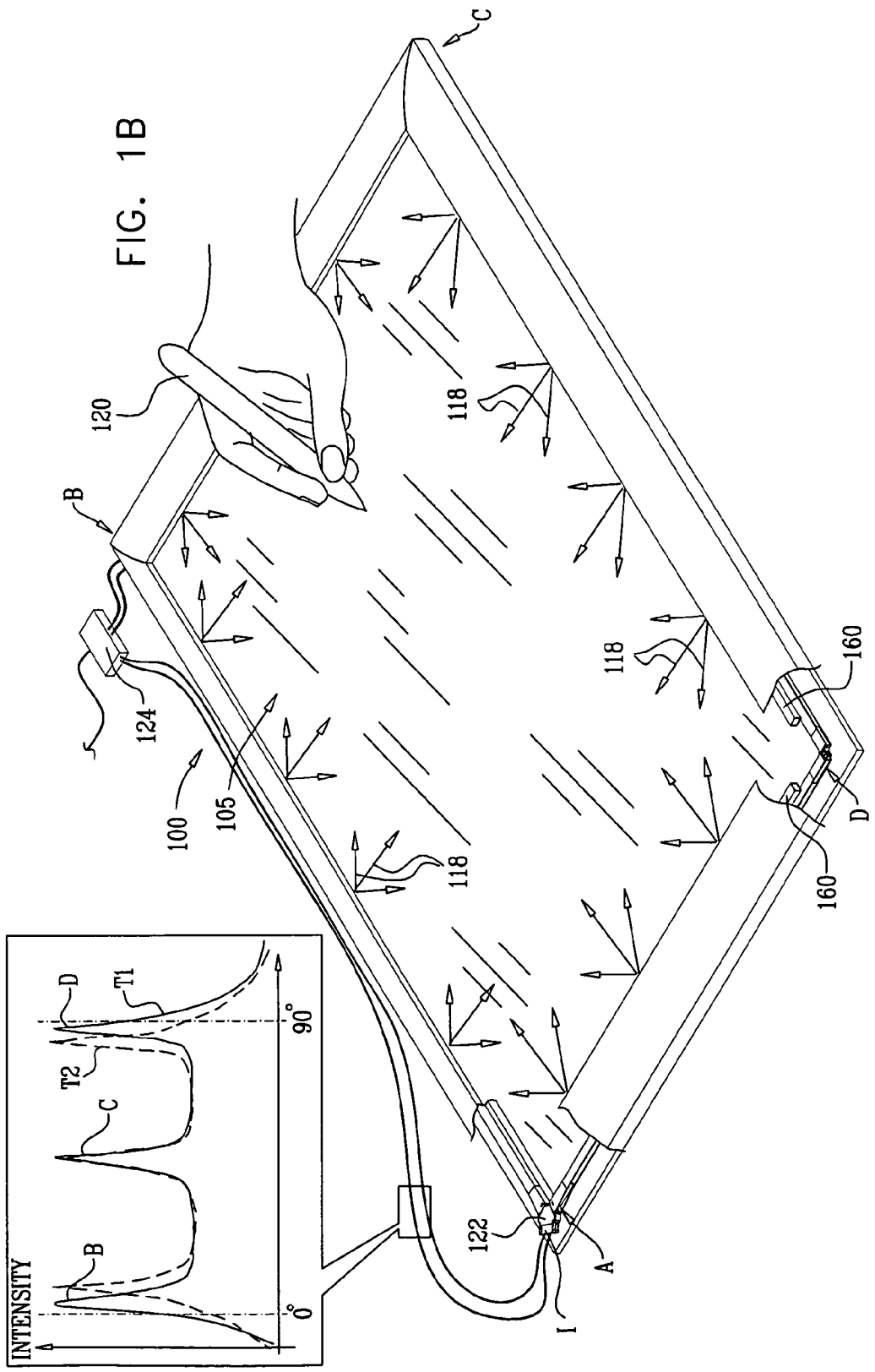

Heat induced expansion of these lenses may cause a change in the focal length of the lenses and a concommitant change in the angular field of view of the sensor assemblies 122. As seen in FIGS. 1A and 1B, in the illustrated example, at a increased temperature, indicated by T2>T1, the angular field of view of the sensor assembly 122 is increased, resulting in an angularly inward shift of sensed intensity peaks, designated by B and D, which correspond to the light sources B and D viewed by sensor assembly I. The result is that an object located at a given position on the touch screen will appear to be located at a different position, the extent of the difference being a function of temperature.

In accordance with a preferred embodiment of the present invention, this problem is overcome by calibrating controller 124 in a manner which is responsive to shifts in the sensed location of peaks B and D, which correspond to light sources B and D, to correct for the temperature-induced shifts. A preferred calibration formula which corrects the X-Y output of controller 124 by correcting the output of sensors 122 in response to sensed shifts in peaks B and D is set forth hereinbelow:

> Sensor 205 (FIG. 5A) comprises 2048 pixels and has a readout vector defined as V[0,2047]. This readout vector is subject to a distortion, such that V'=A*V+B, where A and B are scalars representing linear scaling and translation respectively, V is the original readout vector and V' is the distorted readout vector. The original locations of peaks B and D are referred to as key-patterns and are recorded during calibration of the system as defining the sensor's readout area of size S (pixels) and position P (pixel numbers). For the purpose of operations, the key patterns may be represented as vectors of pixel values in a S-dimensional space. Given a possibly distorted readout R, a set of test vectors is created for every key-pattern. This set of test vectors has dimensions S, equal to that of the respective key-pattern, and is shifted from the respective key-pattern's position P. For all test-vectors in the set, a distance D to the respective key-pattern is calculated according to appropriate metric and position shift Sv, which minimizes the distance D, is found. For every pair of key-patterns with dimensions S and position P and test-vector with shift Sv the following equation may then be written: $[P:P+S]=A*[P+S_v:P+S_v+S]+B$. By solving a set of such equations for two or more key-patterns the unknown coefficients A and B are found.

Figure 8A:
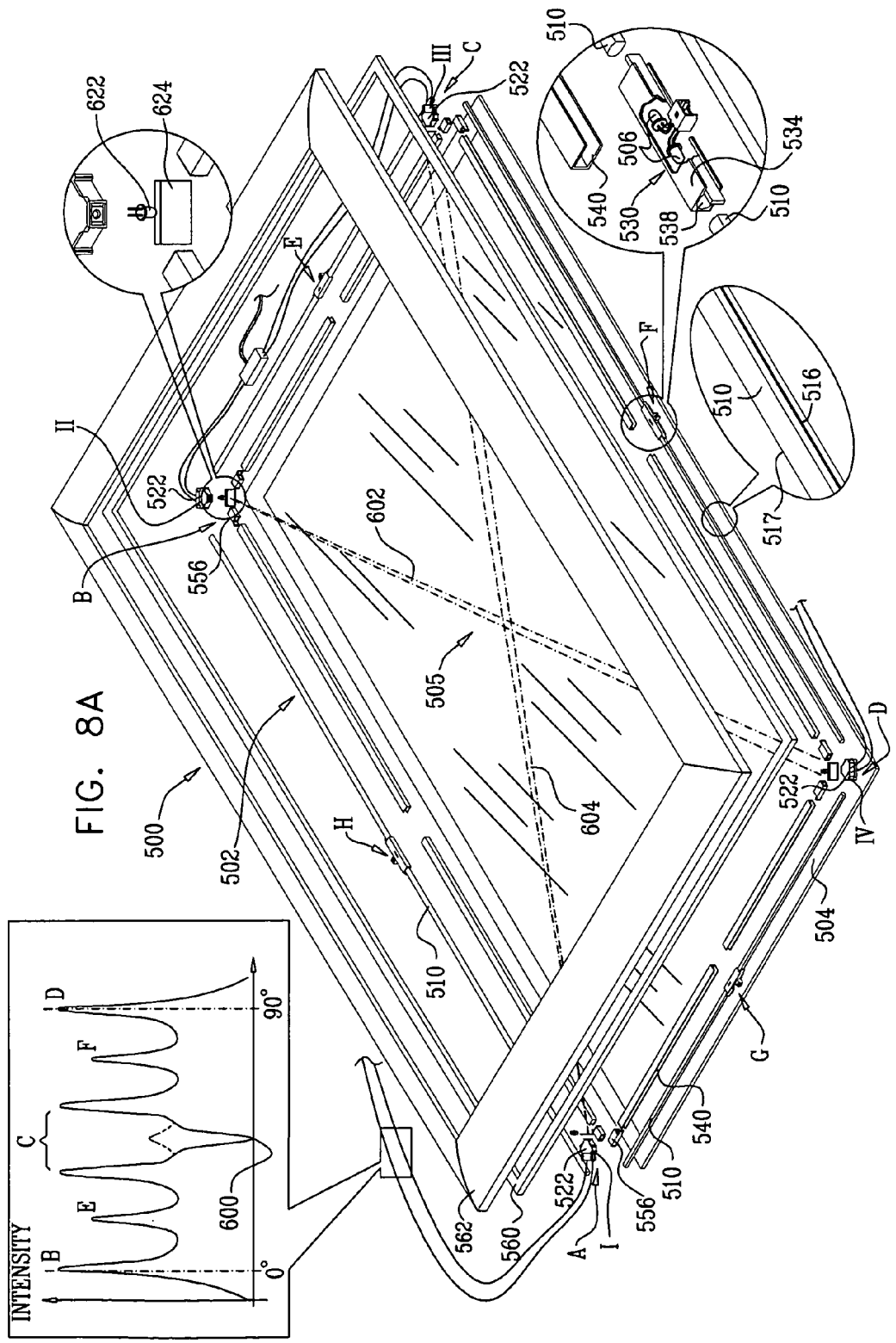

Reference is now made to FIGS. 8A and 8B, which illustrate an optical touch panel 500 constructed and operative in accordance with another preferred embodiment of the present invention. As seen in FIGS. 8A and 8B, touch panel 500 comprises an optical illumination assembly 502 which is preferably arranged along and above all or part of the periphery of a support 504, typically a glass plate as shown in FIG. 8A. Alternatively, the glass plate may be obviated and the support 504 may be a frame, similar to that shown in FIGS. 2A-2C. Preferably, the optical illumination assembly 502 extends along most of the periphery of support 504 and typically along all four edges of a generally planar detection region 505.

In accordance with a preferred embodiment of the present invention, the optical illumination assembly 502 preferably receives illumination from one or more light sources 506, such as an LED or a diode laser, preferably an infrared laser or infrared LED. In the embodiment of FIGS. 8A and 8B, light sources 506 are preferably located in the center of a side of the periphery of the generally planar detection region 505. The one or more light sources 506 are designated by letters E, F, G and H.

In accordance with a preferred embodiment of the present invention, the optical illumination assembly 502 comprises at least one light guide 510, such as a plastic rod, which preferably has at least one light scatterer 516 at least one location therealong, preferably opposite at least one light transmissive region 517 of the light guide 510, at which region 517 the light guide 510 has optical power. A surface of light guide 510 at transmissive region 517 preferably has a focus located in proximity to light scatterer 516.

In the illustrated embodiment, light scatterer 516 is preferably defined by a narrow strip of white paint extending along the plastic rod along at least a substantial portion of the entire length of the optical illumination assembly 502.

In accordance with a preferred embodiment of the present invention, the at least one light scatterer 516 is operative to scatter light which is received from the light source 506 and passes along the at least one light guide 510. The optical power of the light guide 510 at the at least one light transmissive region 517 collimates and directs the scattered light in a direction generally away from the scatterer 516, as indicated generally by reference numeral 518. It is appreciated that generally every location in generally planar detection region 505 receives light generally from every location along the at least one light transmissive region 517.

In accordance with a preferred embodiment of the present invention, the at least one light guide 510 extends generally continuously along a periphery of a light curtain area defined by the detection region 505 and the at least one light scatterer 516 extends generally continuously along the periphery, directing light generally in a plane, filling the interior of the periphery and thereby defining a light curtain therewithin.

In an alternative embodiment, the at least one light guide 510 extends along a periphery of a light curtain area defined by the detection region 505 and the at least one light scatterer 516 includes a plurality of separate light scatterers distributed along the periphery, whereby the plurality of light scatterers direct light generally in a plane, filling the interior of the periphery and thereby together defining a light curtain therewithin.

Impingement of an object, such as a finger or stylus 520, upon support 504 preferably is sensed by one of more light sensor assemblies 522, preferably disposed at corners of detection region 505. The sensor assemblies 522 detect changes in the light received from the optical illumination assembly 502 produced by the presence of stylus 520 in the detection region 505. Preferably, sensor assemblies 522 are located in the same plane as the optical illumination assembly 502. In the embodiment of FIGS. 8A and 8B, four sensor assemblies 522 are provided to detect stylus 520 anywhere in the detection region 505, each sensor assembly 522 being located at a corner of the detection region 505 and having at least 90 degree coverage. The light sensor assemblies 122 at the respective corners are respectively designated by roman numerals I, II, III and IV Preferably, sensor assemblies 522 each employ linear CMOS sensors, such as sensors described hereinabove with reference to the embodiment of FIGS. 1A-7B. The outputs of sensor assemblies 522 are supplied to detection circuitry 524, such as that described hereinabove with reference to the embodiments of FIGS. 1A-7B, which provides an output indication of the two dimensional location of the stylus 520 impingement in the detection region 505.

In the illustrated embodiment, there is provided at least one mechanical coupling and optical coupling assembly 530, each of which preferably includes a pair of light sources 506, preferably mounted onto a PCB (not shown), and at least one coupling element 534, which includes sockets (not shown), for receiving and retaining light sources 506, and sockets 538, for receiving and retaining ends of light guides 510. The one or more light sources at each respective corner are designated by letters A, B, C and D.

Coupling elements 534 are preferably located between two adjacent corners of support 504 and are adhered thereto, preferably by adhesive. Coupling elements 534 are arranged to butt against a pair of coaxially extending light guide covers 540. Coupling assembly 530 is preferably made from a transparent or translucent material so that sufficient light from light sources 506 can scatter or diffuse through the coupling assembly 530 so that no gaps are formed in the illumination of detection region 505.

In the embodiment of FIGS. 8A and 8B, there are also provided four sensor and mechanical coupling assemblies 550, each of which includes a sensor assembly 522 and a part of mechanical coupling elements 556 for receiving and retaining an end of a light guide 510. As seen in FIG. 8A, light guide cover 540 is preferably butted against coupling element 556.

In an alternative embodiment (not shown) sensor assemblies 550 can be comprised of illumination, mechanical coupling and optical coupling assemblies similar to sensor, illumination, mechanical coupling and optical coupling assembly 150 (FIG. 3A), each of which includes a sensor assembly 122 and a pair of mechanical and optical coupling elements 152 which are connected to sensor assembly 122. Each of mechanical and optical coupling elements 152 preferably includes a socket 156, for receiving and retaining light sources 106, and a socket 158, for receiving and retaining an end of a light guide 110. Each of mechanical and optical coupling elements 152 is arranged to butt against light guide cover 140. Alternatively, one or both light sources 106 may be obviated in assemblies 150.

Preferably, there is provided a water-proof and dust proof seal between support 504, light guide covers 540 and assemblies 530 and 550, thereby to protect the touch panel assembly. The interiors of light guide covers 540 and assemblies 530 and 550 are preferably sealed from the outside. Preferably a circumferential gasket 560 is employed to sealingly surround these elements at the periphery of support 504 and to seal them to a circumferential cover element 562.

It is appreciated that the use of three or four sensor modules enables unambiguous detection of two or three simultaneous events, respectively.

It is appreciated that, although in the illustrated embodiments of FIGS. 1A and 1B and 8A and 8B, the optical touch panel is shown as a generally rectangular touch panel, the touch panel of the present invention may be of any suitable shape.

It is seen that FIGS. 8A and 8B each include a graph indicating angular response of sensors in the touch panel and an angular region of the touch panel for which the sensors would be non-responsive but for the provision of an auxiliary illumination subsystem. The graphs in FIGS. 8A and 8B include a portion, designated by reference numeral 600 which indicates corresponding angular regions 602 of the touch panel for which the sensors II and IV would be non-responsive but for the provision of an auxiliary illumination subsystem and corresponding angular regions 604 of the touch panel for which the sensors I and III would be non-responsive but for the provision of an auxiliary illumination subsystem. Note that these graphs are not to scale, with corner region C enlarged to show the peaks caused by the illumination at either side of sensor assembly III and the hole in the middle where the sensor assembly lies.

An auxiliary illumination subsystem is preferably provided at each corner of the touch screen seen in FIGS. 8A and 8B. Such subsystems are shown generally in FIGS. 3A-4C and 8A and 8B and shown in greater detail in FIG. 8C. As seen with particularity in FIG. 8C, the auxiliary illumination subsystem 620 preferably includes at least one auxiliary illumination source 622 and at least one partially transmissive, partially reflective optical element 624 disposed along a light path to at least one corresponding light detector 522 in FIGS. 8A and 8B, so as to illuminate the corresponding angular region 602 or 604. It is appreciated that the illumination sources 622 and the partially transmissive, partially reflective optical elements 624 provide illumination to angular regions 602 and 604 which would otherwise be unilluminated, as seen in regions 600 of the graphs in FIGS. 8A and 8B, since light sources are not present at the corners at which detectors 522 are located.

The partially transmissive, partially reflective optical elements 624 provide a light transmissive optical path for light to said at least one light detector and provide a light reflective optical path for light from said at least one auxiliary illumination source. Preferably, the light transmissive optical path and the light reflective optical path are at least partially coextensive. Additionally, it is preferred that the light transmissive optical path and the light reflective optical path at least partially extend parallel to the generally planar display surface.

In the illustrated embodiment, pairs of light detectors 522 each lie in a field of view of the other and there are provided corresponding pairs of auxiliary illumination sources and pairs of partially transmissive, partially reflective optical elements, disposed along the respective light paths to respective ones of pairs of light detectors.

Light from respective ones of said first and second auxiliary illumination sources is directed by respective ones of said partially transmissive, partially reflective optical elements towards respective ones of light detectors.

It will be appreciated by persons skilled in the art that the present invention is not limited by what has been particularly claimed hereinbelow. Rather the scope of the present invention includes various combinations and subcombinations of the features described hereinabove as well as modifications and variations thereof as would occur to persons skilled in the art upon reading the foregoing description with reference to the drawings and which are not in the prior art.

The invention claimed is:

1. An optical touch screen comprising:
a generally planar display surface;
an optical illumination assembly arranged generally along at least part of a periphery of said generally planar display surface;
at least one light detector arranged to detect light distribution produced by said optical illumination assembly and changes in said light distribution produced by the presence of an object in predetermined propinquity to a region of said generally planar display surface;
detection circuitry receiving at least one output from said at least one light detector and providing an output indication of a two-dimensional location of said object relative to said generally planar display surface; and
calibration functionality responsive to changes in said light distribution other than changes produced by the presence of an object in predetermined propinquity to a region of said generally planar display surface for calibrating said detection circuitry so as to compensate for changes in an angular field of view of said light detector,
said calibration functionality being responsive to temperature induced changes in said light distribution which result at least in part from temperature induced changes in a focal length of at least one optical element in said at least one light detector and cause changes in the angular field of view of said light detector.

2. An optical touch screen according to claim 1 and wherein said calibration functionality calibrates an output of said detection circuitry which represents said two-dimensional location of said object relative to said generally planar display surface.

3. An optical touch screen according to claim 1 and wherein said changes in light distribution other than changes produced by the presence of an object in predetermined propinquity to a region of said generally planar display surface comprise shifts in apparent positions of peaks of light sources in said optical illumination assembly.

* * * * *